United States Patent
Yokogi

(12) 
(10) Patent No.: US 6,189,369 B1
(45) Date of Patent: Feb. 20, 2001

(54) GAS LEAKAGE DETECTING APPARATUS

(75) Inventor: Kazuo Yokogi, Hyogo-ken (JP)

(73) Assignee: L'Air Liquide, Societe Anonyme pour l'Etude et l'Exploitation des Procedes Georges Claude

( * ) Notice: Under 35 U.S.C. 154(b), the term of this patent shall be extended for 0 days.

(21) Appl. No.: 09/201,766

(22) Filed: Dec. 1, 1998

(30) Foreign Application Priority Data

Dec. 2, 1997 (JP) .................................................. 9-332218

(51) Int. Cl.[7] .................................................. G01M 3/22
(52) U.S. Cl. .................................. 73/40.7; 73/46; 340/605
(58) Field of Search .............................. 73/40, 40.7, 46; 340/605

(56) References Cited

U.S. PATENT DOCUMENTS

| | | | | |
|---|---|---|---|---|
| 4,294,106 | * | 10/1981 | Gevaud et al. | 73/40.7 |
| 5,293,771 | * | 3/1994 | Ridenour | 73/40 |
| 5,563,335 | * | 10/1996 | Howard | 73/46 |
| 6,029,503 | * | 2/2000 | Sumioki | 73/40 |

FOREIGN PATENT DOCUMENTS 64-84127 * 3/1989 (JP) .......................................... 73/40

\* cited by examiner

*Primary Examiner*—Daniel S. Larkin
(74) *Attorney, Agent, or Firm*—Burns, Doane, Swecker & Mathis, LLP

(57) ABSTRACT

The present invention provides a gas leakage detecting apparatus capable of detecting a gas leak in a cylinder cabinet with accuracy. The gas leakage detecting apparatus comprises a first air take-out pipe for taking out air from the inside of an exhaust duct of a cylinder cabinet and leading the same air to a gas sensor; a second air take-out pipe for taking out air at a given position in said cylinder cabinet and leading the same air to said gas sensor; a first shut-off valve and a second shut-off valve respectively provided on the respective air take-out pipes so that air from these air take-out pipes is selectively led to said gas sensor; and a control means for controlling the opening and closing operation of these shut-off valves. Owing to this construction, one is able to monitor the location of the gas leak upon taking out air from the cylinder cabinet through the second air take-out pipe.

2 Claims, 4 Drawing Sheets

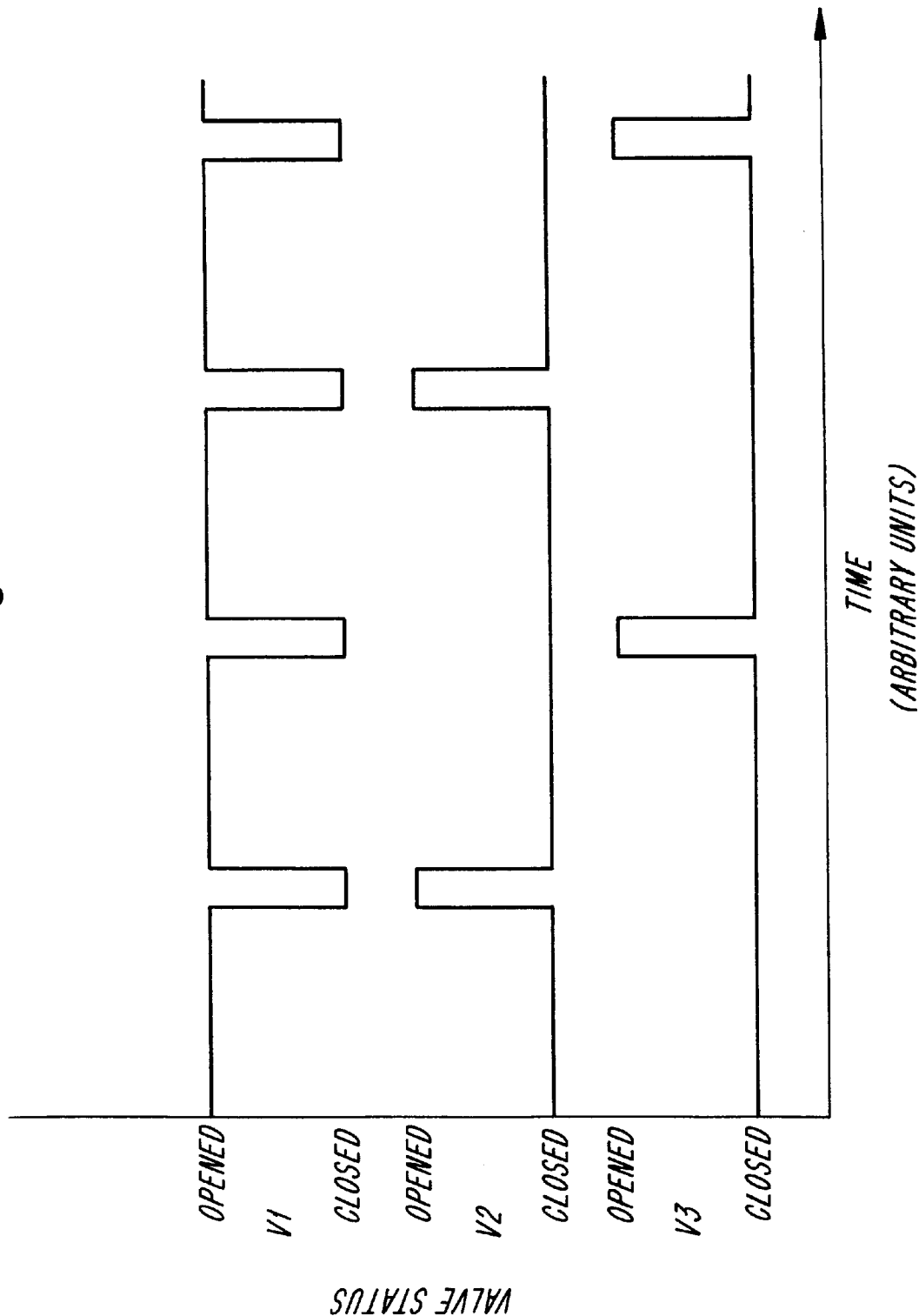

GAS LEAKAGE DETECTING APPARATUS

BACKGROUND OF THE INVENTION

1. Field of the Invention

The present invention relates to a casing, in which a gas container is to be accommodated, i.e. a cylinder cabinet. More specifically, the present invention relates to a gas leakage detecting apparatus provided with such a cylinder cabinet.

2. Description of the Prior Art

A special material gas for use in the manufacture of semiconductors is usually used as stored in a portable gas container which is called a gas bomb or gas cylinder. As to such special material gases for use in the manufacture of semiconductors, there are many dangerous gases having combustibility (explosiveness), toxicity, corrosiveness or combustion-supporting properties, and hence they must be given with thoughtful consideration in safety when used. Accordingly, a gas container filled with a dangerous special material gas has been hitherto accommodated in a casing, which is referred to as a cylinder cabinet, thereby coping with an unforeseen gas leakage.

The cylinder cabinet itself functions as a closed box for preventing a gas from spreading to the atmosphere, the inside of which is normally ventilated so that a leaked gas can be diluted and exhausted. Its design is such that air is taken in by an air take-in port in the lower portion of the cylinder cabinet and the same air is discharged to the atmosphere through an exhaust duct in the upper portion thereof. Furthermore, said exhaust duct has a gas leakage detecting apparatus connected thereto, whereby it is possible to monitor for leaked gas.

Although one is obligated to carry out normal exhaust in a cylinder cabinet in accordance with the related laws, it is very important for safety reasons that such normal exhaust is carried out at a proper ventilation ratio or ventilation quantity depending on the kind of a gas. In the case of a combustible gas such as monosilane, for instance, it is necessary to carry out ventilation by introducing air in an amount equal to 10 times the volume of the cylinder cabinet every minute. When such a large volume of air is used, it becomes difficult to detect a gas leakage even if it takes place.

On the other hand, it is known from experience that a gas leakage seldom takes place during the usual supply of a gas, rather it takes place, in many cases, upon the exchange of a gas container or just after the exchange. Namely, the gas leakage will take place where the closing of the valve of a gas container (which will be hereafter called "a container valve") is unsatisfactory during the separation of a container valve and a pipe is carried out in order to exchange a gas container, or where the actual gas purge is started up in spite of the fact that the connection of the container valve and the pipe is unsatisfactory after the gas container exchange is completed. Also as to the place where a gas leakage occurs, it is known that such place is generally a specific given place, for example, a removable pipe joint between a gas container and a pipe, or a valve or a pressure reduction valve in a pipe.

Although the time when a gas leakage can occur and the location where it takes place are roughly understood, according to the gas leakage detecting apparatus of the prior art, a good detection result may not be obtained because the apparatus is constructed such that a gas leakage is detected by sampling air in an exhaust duct.

In consideration of this problem, it is an object of the present invention to provide a gas leakage detecting apparatus, by which the accuracy of detecting gas leaks can be improved.

SUMMARY OF THE INVENTION

In order to achieve the aforementioned objective, the present invention is characterized by a gas leakage detecting apparatus for detecting a gas leakage in a casing accommodating a gas container, which comprises: a gas sensor for detecting a leaked gas; a first air take-out pipe for taking out air from the inside of an exhaust duct provided in said casing and leading the same air to said gas sensor; a second air take-out pipe for taking out air at a given position in said casing and leading the same air to said gas sensor; a first shut-off valve and a second shut-off valve respectively provided in said first and second air take-out pipes so that air from said first and second air take-out pipes is selectively and controllably led to said gas sensor; and a control means for controlling the opening and closing operation of said first and second shut-off valves.

Although a gas leakage can be monitored, in normal operation, by sampling air in the exhaust duct from the first air take-out pipe as in the prior art, the present construction also enables one, on demand, to monitor a gas leakage locally by taking out air at an optional selected position, for example in the vicinity of a pipe joint in the casing of the second air take-out pipe.

It is preferred that a flexible portion be provided in the second air take-out pipe, whereby an end on the air take-in side of the pipe can be disposed at an optional selected position in said casing. If a to-be-connected member, to which the end of said second air take-out pipe on the air take-in side is detachably connected, is provided in said casing, and a connection detecting means for detecting whether said end on the air take-in side is connected with said to-be-connected member, the switching control of the first and second shut-off valves by the control device can be carried out on the basis of a detection result of the connection detecting means.

Furthermore, the apparatus may be designed such that the end of said second air take-out pipe on the air take-in side is fixed at a given position in said casing and said first and second shut-off valves are simply periodically opened and closed, alternately.

BRIEF DESCRIPTION OF FIGURES OF THE DRAWING

FIG. 4 is a timing chart showing a timing of opening and closing a shut-off valve in an air take-out pipe in the embodiment illustrated in FIG. 3.

DETAILED DESCRIPTION OF THE PREFERRED EMBODIMENTS

Figure 1:
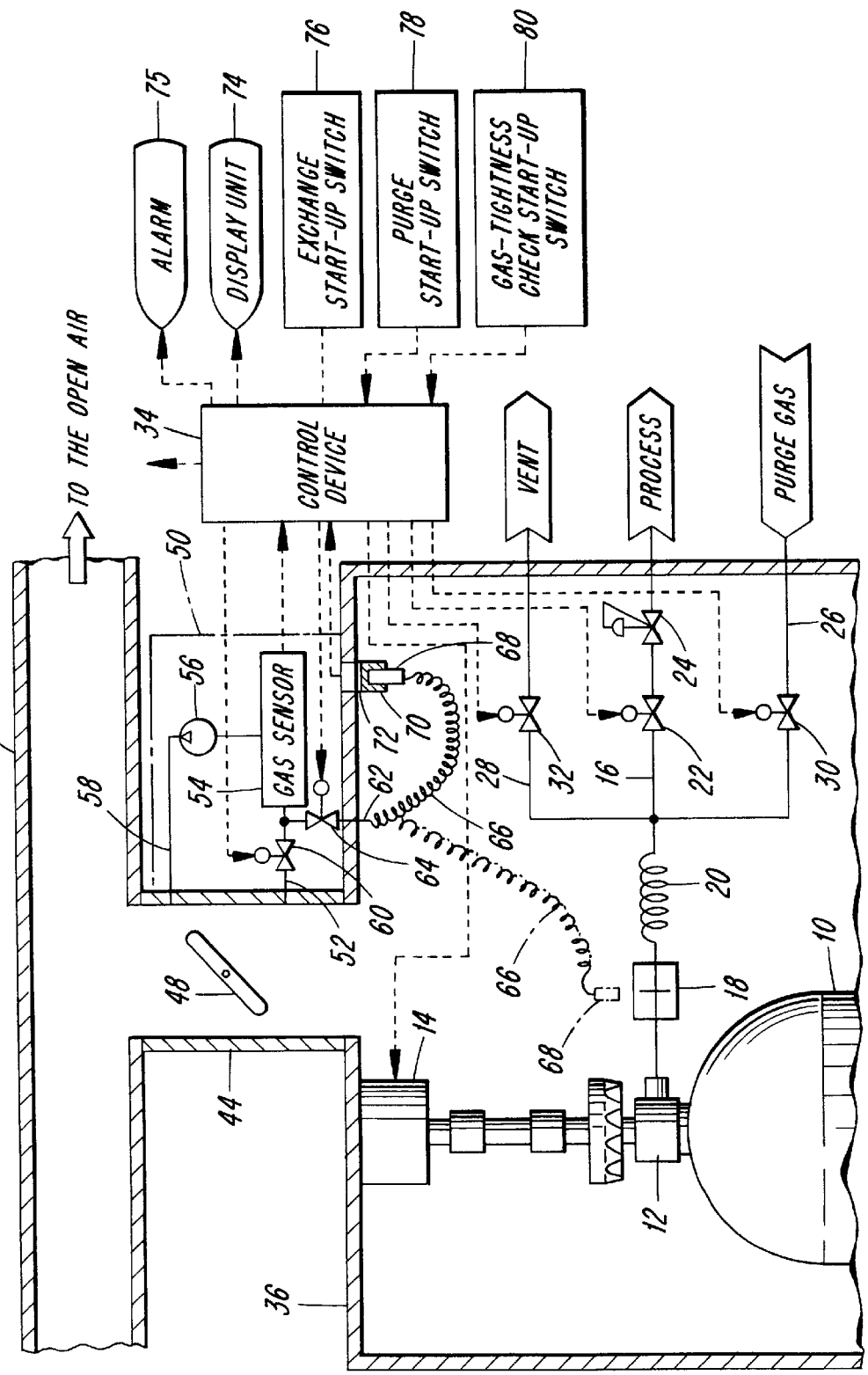
FIG. 1 is a rough view showing one embodiment of the present invention.

Referring to the figures of the drawing, the preferred embodiments of the present invention will be described in detail. In the drawing, the same numeral is assigned to the same or corresponding item. More specifically, the following reference numerals have consistently been used:

10—gas container; 12—container valve; 16, 26, 28—pipe; 18—pipe joint; 34 control device (control means); 36—cylinder cabinet (casing); 42—air take-in port; 44—exhaust duct, 50—gas leakage detecting apparatus; 52—first air take-out pipe; 54—gas sensor; 56—air pump, 58—return pipe; 60, VI—first shutoff valve; 62, 62a, 62b—second air take-out pipe; 64, V2, V3—second shut-off valve; 66—pigtail tube portion; 68—plug (end on the air take-in side); 70—socket (to-be-connected member); 72—photoelectric sensor (connection detecting means).

FIG. 1 shows roughly a gas supply system, in which a gas leakage detecting apparatus according to the present invention is provided. The illustrated gas supply system is intended to supply a special material gas for use in the manufacture of semiconductors, such as a silane-series gas or the like, to an appointed semiconductor-manufacturing unit (not shown), where a gas container 10 is used as the gas supply source. The gas container 10 has a container valve 12 attached on its mouth portion, and this container valve 12 is made capable of being remotely opened and closed by means of a pneumatic actuator-driven automatic switchgear 14. To the discharge port of the container valve 12 is removably connected one end of a pipe 16 as a process line for supplying a gas to a semi-conductor manufacturing unit by way of a pipe joint 18. In the pipe 16, there are provided, in order from the side of said container valve 12, a flexible pipe portion 20 for facilitating the removal of said pipe joint 18, a shutoff valve 22, and a diaphragm type pressure regulation valve 24. Further to this pipe 16 are connected two pipes 26, 28 between the flexible pipe portion 20 and the shut-off valve 22. One pipe 26 is intended to supply a purge gas, such as nitrogen gas, from a purge gas supply source, and the other pipe 28 is intended to vent a remaining gas in the pipe to the open air. Pipe 26 and 28 have a shut-off valve 30, 32 provided therein, respectively. These shut-off valves 22, 30, 32 and automatic switchgear 14 will be controlled by a control device 34 for the gas supply system. Although not illustrated, in addition, the pipe 28 has a harmful substances eliminator provided at its end.

Figure 2:
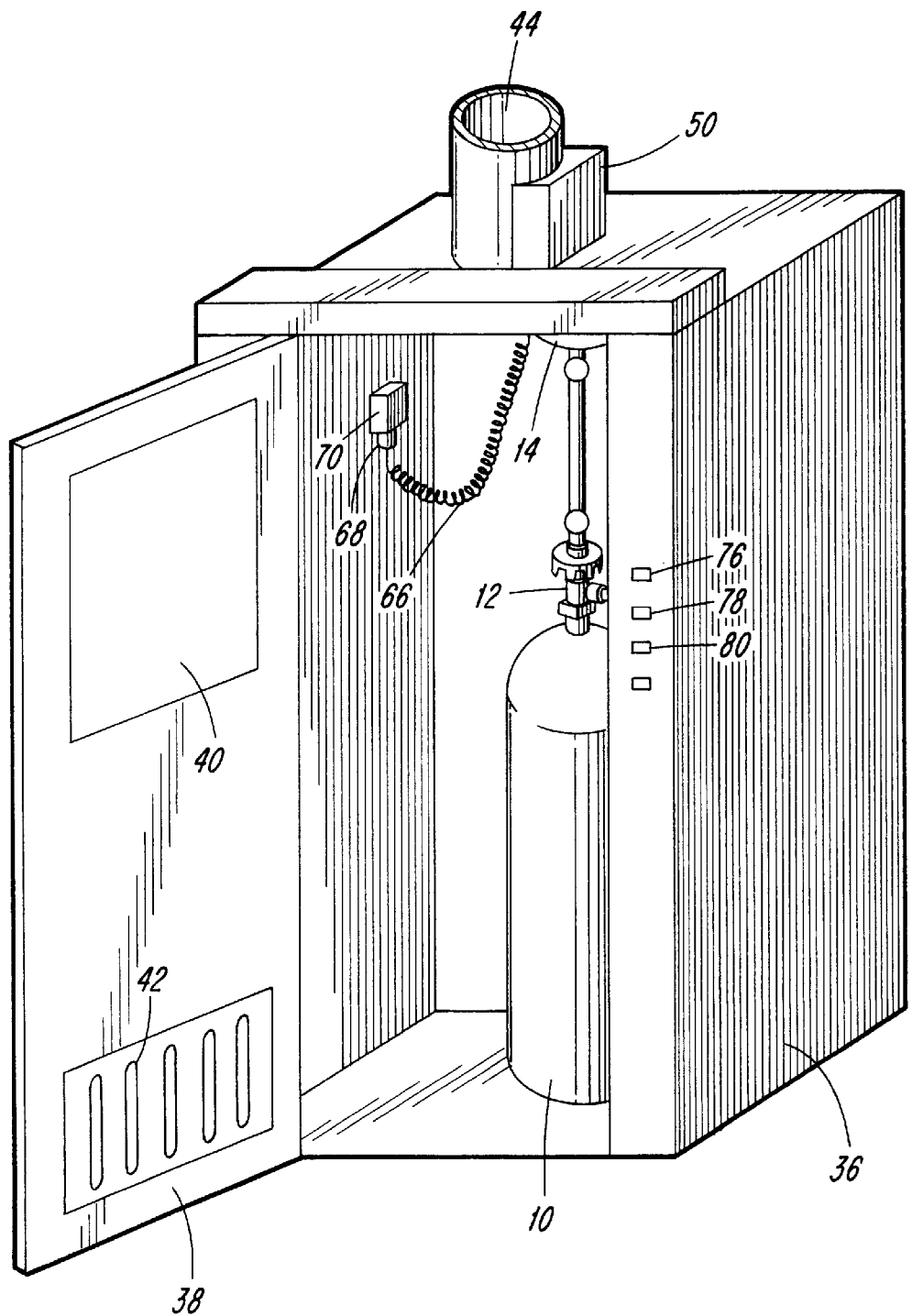
FIG. 2 is a perspective view showing a construction of a cylinder cabinet, in which the gas leakage detecting apparatus according to the present invention is provided.

Attempting to achieve safety against a gas leakage, as clearly shown in FIG. 2, the gas container 10 is accommodated in a cylinder cabinet (casing) 36. The entirety of said cylinder cabinet 36 is assembled with stainless steel sheets or the like, and the front face portion thereof is a door 38 which will be used upon exchange of the gas container. This door 38 is constructed so as to be locked as it is closed by means of a locking mechanism (not shown) which will be controlled by the aforementioned control device 34. In the upper portion of the door 38 is provided an operation window 40 capable of being opened and closed. It is constructed such that the attaching and detaching operation of the pipe joint 18 is enabled through this window 40.

In the lower portion of said door 38 is formed an air take-in port 42 for ventilation, and on the upper plate of said cylinder cabinet 36 is provided an exhaust duct 44. This exhaust duct 44 is connected to a main exhaust duct 46 (see FIG. 1) disposed in a building. The terminal end of said main exhaust duct 46 is opened to the open air by way of a scrubber, which is the harmful substances eliminator, and an exhaust fan (both not shown).

If the exhaust fan is driven, air will be taken into the cylinder cabinet 36 through the air take-in port 42 by virtue of its suction force, and discharged to the open air from the exhaust duct 44 by way of the main exhaust duct 46. In the exhaust duct 44 is disposed a damper 48. By regulating the angle of inclination of this damper 48, the amount of ventilation air can be regulated.

On the exhaust duct 44 of the cylinder cabinet 36 is attached the gas leakage detecting apparatus 50 according to the present invention. As shown in FIG. 1, the gas leakage detecting apparatus 50 has a first air take-out pipe 52 connected to the lower portion of the exhaust duct 44 so as to take out a part of the air left after ventilation, which flows through the exhaust duct 44. To the other end of this first air take-out pipe 52 is connected a gas sensor 54 capable of detecting a special material gas stored in the gas container 10. Output signals from this gas sensor 54 will be fed into the control device 34. To the air outlet portion of said gas sensor 54 is connected an air pump 56 for sucking air. Furthermore, a return pipe 58 for returning air to the exhaust duct 44 extends from the discharge port of said air pump 56, and the other end of this return pipe 58 is connected to the exhaust duct 44 or the main exhaust duct 46.

The first air take-out pipe 52 has a first shut-off valve 60 provided therein. This shut-off valve 60 will be controlled so as to be opened and closed by means of the control device 34. To the first air take-out pipe 52 is connected a second air take-out pipe 62 at a proper position between the first shut-off valve 60 and the gas sensor 54. Also, in this second air take-out pipe 62, there is provided a second shut-off valve 64 which will be controlled by the control device 34. In the case where air or the leaked gas is adsorbed on the inner surface of these air take-out pipes 52, 62, in addition, this adsorption may hinder the detection of gas leakage, and hence it is preferred that the air take-out pipes 52, 62 are made of a material with little gas adsorptivity, or their inner surface is coated with such material. It is effective to use a TEFLON (synthetic resinous fluorine-containing polymers) tube or a pipe whose inner surface is treated with TEFLON. Besides, it is preferred, for the same purpose, that the whole length of the air take-out pipes 52, 62 is shortened as much as possible.

The second air take-out pipe 62 extends through the cylinder cabinet 36. A portion 66 of the second air take-out pipe 62 positioned in the cylinder cabinet 36 possesses flexibility, and it is preferably of an expandable tube which is generally called a pigtail tube or curl tube.

The fore end of the pigtail tube portion 66 of said second air take-out pipe 62 is an end on the air take-in side, on which a tubular plug 68 is attached. The plug 68 is a male member of a well-known quick joint, and it is connectable with a socket (a to-be-connected member) 70 which is a female member provided at a proper position in the cylinder cabinet 36. In the socket 70, a photoelectric sensor 72 is provided as-a means for detecting that the plug 68 is connected therewith, and its output signals will be fed to the control device 34.

The operation of the present invention will next be described, using the aforediscussed construction, as one example of a gas container-exchange operation. As a premise, in addition, it shall be given that the inside of the cylinder cabinet 36 is always ventilated, where air is introduced from the air take-in port 42 in the lower portion of the cylinder cabinet 36 and flows to the main exhaust duct 46 by way of the exhaust duct 44. Further, it shall be given that the air pump 56 of the gas leakage detecting apparatus 50 is also driven at all times.

In the normal supply of a gas prior to the start of an operation, the container valve 12 and shut-off valve 22 are opened and the shut-off valves 30, 32 are closed so that a special material gas is supplied from the gas container 10 to a semiconductor-manufacturing unit (not shown) by way of the pipe 16. At that time, the plug 68 of said second air take-out pipe 62 is in connection with the socket 70. The control device 34 has recognized the connected state of the plug 68 by a detection signal from the photoelectric sensor 72, and it sets, as a result of this recognition, the first shut-off valve 60 in the first air take-out pipe 52 opened and the second shut-off valve 64 in the second air take-out pipe 62 closed. Thus, air in the exhaust duct 44 is led to the gas sensor 54 by way of the first air take-out pipe 52, and the monitoring of a gas leakage is started up by use of the air in the exhaust duct 44 as a sample. If a special material gas is mixed therewith, its output signals will be fed to the control device 34.

In a case where the exchanging work of the gas container 10 is started up, with no abnormality in the normal supply of the gas, a worker first turns on an input unit, for example an exchanging work start-up switch 76. When the control device 34 receives an input signal from said switch 76, it drives the automatic switchgear 14 to close the container valve 12. Then, the control device 34 closes the shut-off valve 22 in the pipe 16.

If the closing of the container valve 12 is completed, the control device 34 will display in the display unit 74 directions for starting up a purge prior to the removal. When a worker turns on the purge start-up switch 78 in accordance with this display, the shut-off valves 30, 32 in the pipes 26, 28 are opened. Thus, a purge gas is permitted to flow from a purge gas supply source through the pipe 26 so that the special material—gas existing in the pipe 16 between the container valve 12 and the shut-off valve 22 is expelled to the open air through said pipe 28 for vent use.

If the purge prior to the removal is completed, the control device 34 will display directions for opening the operation window 40 of the cylinder cabinet 36 and removing the plug 68 of the second air take-out pipe 62 from the socket 70. On the basis of this display, the worker opens the operation window 40 and puts in his own hand through there to remove the plug 68 from the socket. Then, the same plug 68 will be preferably held at the vicinity of the pipe joint 18 of the pipe 16 by a proper means (see the two-dot chain line in FIG. 1).

After the plug 68 is removed from the socket 70, the control device 34 recognizes that state depending on a signal from the photoelectric sensor 72, and closes the first shut-off valve 60 and opens the second shut-off valve 64. As a result, sample air for detection of a gas leakage is taken out of a region in the vicinity of the pipe joint 18 of the pipe 16. At the same time, the control device 34 releases a lock of the door 38 of the cylinder cabinet 36, thereby enabling one to take out the used gas container 10 and to replace a new gas container 10. In addition, it is preferable, from a viewpoint of multiplexing fail-safe and preventing human error in an environment where a special material gas is being handled, that the operation be controlled in progressing to the next step after it is detected that the plug 68 has been removed from the socket 70.

In a taking-out the gas container 10, a worker is destined to first separate the pipe joint 18 between the container valve 12 and the pipe 16 by manual work.

In a case where the closing of the container valve 12 has been insufficient or in a case where the purge prior to the removal has been unsatisfactory, the special material gas will leak out of the separated pipe joint 18. Since air in the vicinity of the pipe joint 18 is sucked, at that time, by the plug 68 of the second air take-out pipe 62 and sent to the gas sensor 54, the concentration of the special material gas existing in this sucked air becomes higher, as compared with the concentration of the special material gas in the air in the exhaust duct 44 under the same condition. Accordingly, a change in the signal from the gas sensor 54 is exhibited sharply and clearly, whereby it becomes possible to detect the gas leakage with accuracy, and further it becomes possible to take quick action such as an alarm 75.

After a gas leakage is detected upon separation of the pipe joint 18, the worker continues by placing a new gas container 10 in the cylinder cabinet 36 and carries out the connection of the container valve 12 with the automatic switchgear 14 and the connection of the container valve 12 with the pipe 16.

Once the placement of the new gas container 10 is completed, the worker will close the door 38 and operation window 40 of the cylinder cabinet 36 and turn on a gastightness checking start-up switch 80 to conduct the gastightness checking of the connection portions of the respective lines. After the purge start-up switch 78 is thereafter turned on again, the insides of the pipes 16, 26, 28 are cleaned up by a purge gas. This step of a purge after the attachment includes also an actual gas purge step. Namely, if the shut-off valve 30 in the pipe 26 is closed and the cleaning of the insides of the container valve 12 and pipes 16, 26, 28 by a purge gas is completed, the control device 34 will drive the automatic switchgear 14 to open the container valve 12, whereby the special material gas is supplied to expel the purge gas remaining in the container valve 12 and pipes 16, 26, 28. In a case where the connection of the pipe joint 18 between the pipe 16 and the container valve 12 is insufficient also at that time, and hence a gas leakage takes place therefrom, the gas leakage can be detected quickly and with accuracy as in the aforementioned case because the plug 68 is held in the vicinity of the pipe joint 18.

If the actual gas purge step is completed with no abnormality, the control device 34 will return the container valve 12 to a closed state, and it displays in the display unit 74 directions for returning the plug 68 to the socket 70. After the worker opens, in accordance with the directions, the operation window 40 and stretches his hand into the cylinder cabinet 36 to insert the plug 68 into the socket 70, the control device 34 sets, on the basis of a signal from the photoelectric sensor 72, the first shut-off valve 60 opened and sets the second shut-off valve 64 closed. When the operation window 40 is finally closed and locked, the shut-off valve 22 and the container valve 12 are opened and the shut-off valve 32 is closed. Thus, the operation is returned to its initial state.

Although the preferred embodiments of the present invention have been described above in detail, it goes without saying that the present invention is not limited to the aforementioned embodiments. In the aforementioned embodiments, for instance, the plug 68 is destined to be separate from the socket 70 throughout the whole period of the gas container exchange, but the plug 68 may be separate therefrom only for a given period of time in the gas container exchange, or also in another step.

Although a quick joint of the plug 68 and socket 70 is used as a means for holding the end of the second air take-out pipe 62 on the air take-in side in the aforementioned embodiment, there can be also used another type of holding means.

Figure 3:
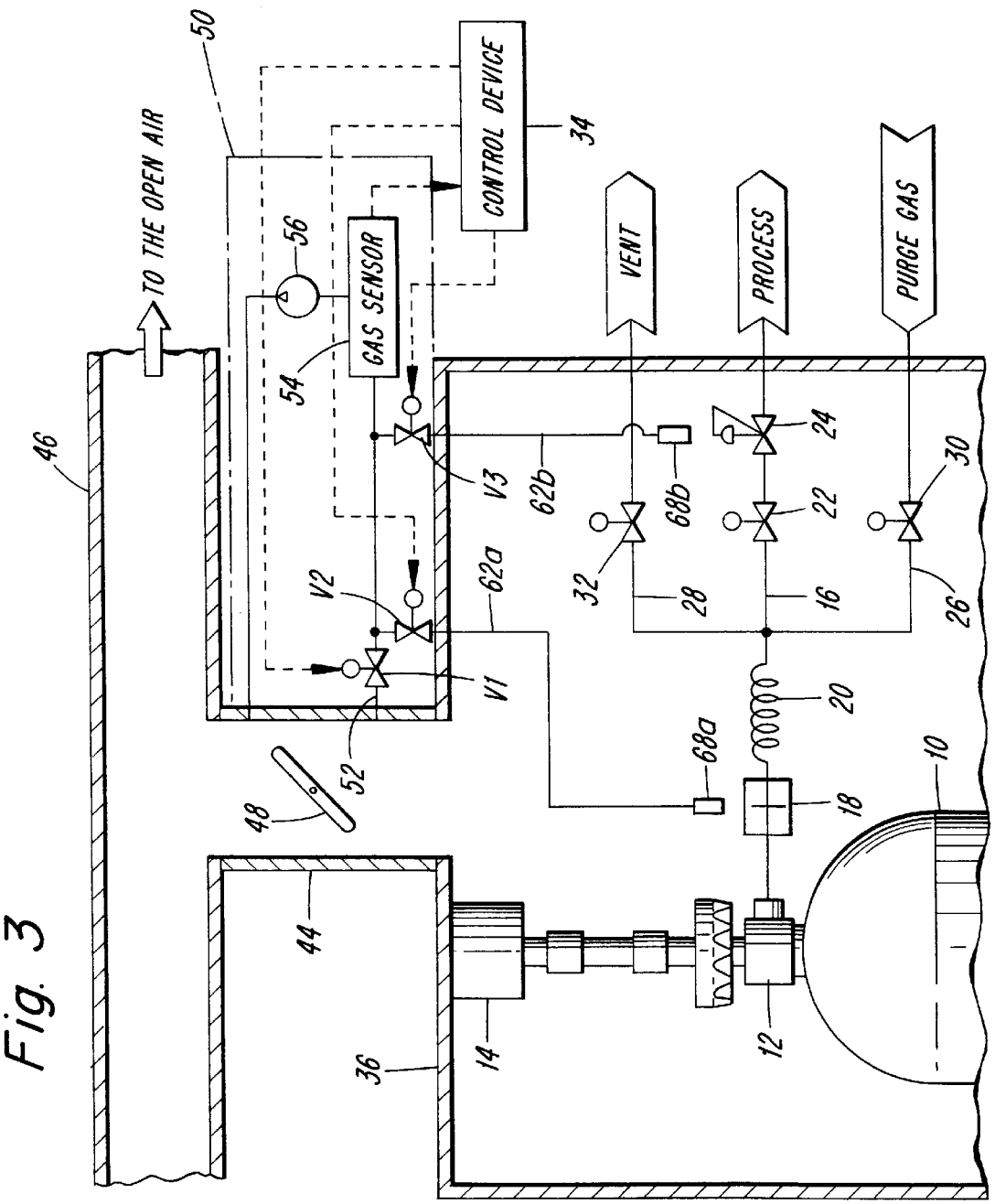
FIG. 3 is a rough view showing another embodiment of the present invention.

Further, the end 68 of the second air take-out pipe 62 on the air take-in side may be fixed at a desired position in the cylinder cabinet 36. In this case, the control device 34 is destined to conduct a control of switching the opening and closing of the first and second shut-off valves 60, 64 at a predetermined time. As to a position where the end 68 on the air take-in side is to be fixed, examples are the vicinity of said pipe joint 18 or the vicinity of the diaphragm type pressure regulation valve 24. One reason is that it can be estimated that in the case of the diaphragm type valve, a diaphragm may be broken. As shown in FIG. 3, two or more second air take-in pipes 62a, 62b may be provided which extend in the cylinder cabinet 36, and their respective ends 68a, 68b on the air take-in side may be fixed in the vicinity of the pipe joint 18 and the pressure regulation valve 24. In this case, the opening and closing operation of the shut-off valves V1, V2, V3 in the respective air take-in pipes 52, 62a, 62b can be controlled in accordance with the timing pattern illustrated in FIG. 4.

According to the present invention, particularly as described above, a gas leakage detection similar to that conventionally used can be carried out, but with ease in monitoring as to when and where a gas leak occurs. The accuracy of detecting a gas leak is therefore improved, and especially in a system using a special material gas such as a silane series gas, safety is greatly improved.

What is claimed is:

1. A gas leakage detecting apparatus for detecting gas leakage in a casing accommodating a gas container, the gas leakage detecting apparatus comprising:

a gas sensor for detecting leaked gas;

a first air take-out pipe for taking out air from the inside of an exhaust duct provided in said casing and leading the air to said gas sensor;

a second air take-out pipe for taking out air at a given position in said casing and leading the air to said gas sensor;

a first shut-off valve and a second shut-off valve respectively provided in said first and second air take-out pipes so that the air from said first and second air take-out pipes is selectively led to said gas sensor;

a control means for controlling the opening and closing operation of said first and second shut-off valves;

said second air take-out pipe having a flexible portion, whereby an end of the second air take-out pipe in said casing can be disposed at an optional position in said casing such that the given position for taking out air in said casing can be made optional;

a to-be-connected member attached to said casing, to which the end of said second air take-out pipe on the air take-in side is detachably connected;

a connection detecting means for detecting that said end on the air take-in side is connected with said to-be-connected member, said control means being configured and arranged to open said first shut-off valve and to close said second shut-off valve when said connection detecting means detects that the end of said second air take-out pipe on the air take-in side has been connected with said to-be-connected member, or to close said first shut-off valve and to open said second shut-off valve in a case where said connection detecting means detects that the end of said second air take-out pipe on the air take-in side has been separated from said to-be-connected member.

2. The gas leakage detecting apparatus according to claim 1, wherein the end of said second air take-out pipe on the air take-in side is fixed at a given position in said casing, and said control means is designed to periodically open and close said first and second shut-off valves, alternately.

* * * * *